(12) United States Patent
Larsson et al.

(10) Patent No.: US 8,187,521 B2
(45) Date of Patent: May 29, 2012

(54) METHOD AND DEVICE FOR PRODUCING THREE-DIMENSIONAL OBJECTS

(75) Inventors: Morgan Larsson, Västra Frölunda (SE); Anders Snis, Uddevalla (SE)

(73) Assignee: Arcam AB (SE)

( * ) Notice: Subject to any disclaimer, the term of this patent is extended or adjusted under 35 U.S.C. 154(b) by 218 days.

(21) Appl. No.: 12/309,849

(22) PCT Filed: Jul. 27, 2006

(86) PCT No.: PCT/SE2006/000917
§ 371 (c)(1),
(2), (4) Date: Aug. 11, 2009

(87) PCT Pub. No.: WO2008/013483
PCT Pub. Date: Jan. 31, 2008

(65) Prior Publication Data
US 2010/0007062 A1    Jan. 14, 2010

(51) Int. Cl.
*H01J 37/30* (2006.01)
(52) U.S. Cl. .................................................. 264/485
(58) Field of Classification Search ............ 264/497, 264/485
See application file for complete search history.

(56) References Cited

U.S. PATENT DOCUMENTS

| | | | |
|---|---|---|---|
| 4,863,538 A | 9/1989 | Deckard | |
| 5,217,583 A | 6/1993 | Sekhar et al. | |
| 5,427,733 A | 6/1995 | Benda et al. | |
| 5,647,931 A | 7/1997 | Retallick et al. | |
| 5,817,206 A * | 10/1998 | McAlea et al. | 156/272.8 |
| 6,007,764 A * | 12/1999 | Benda et al. | 264/497 |
| 7,454,262 B2 | 11/2008 | Larsson | |
| 7,569,174 B2 * | 8/2009 | Ruatta et al. | 264/497 |
| 2003/0028278 A1* | 2/2003 | Darrah et al. | 700/119 |
| 2005/0186538 A1 | 8/2005 | Uckelmann | |

FOREIGN PATENT DOCUMENTS

| RU | 2145269 C1 | 2/2000 |
|---|---|---|
| SE | 524 467 C2 | 8/2004 |

* cited by examiner

*Primary Examiner* — Christina Johnson
*Assistant Examiner* — Galen Hauth
(74) *Attorney, Agent, or Firm* — Lerner, David, Littenberg, Krumholz & Mentlik, LLP

(57) ABSTRACT

A method for producing three-dimensional objects from a powder material which is capable of solidification by irradiation with a high-energy beam is disclosed. The method comprises homogeneously pre-heating the powder material by scanning with the high-energy beam along predetermined paths over a pre-heating area so that consecutive paths are separated by a minimum security distance which is adapted to prevent undesirable summation effects in the pre-heating area, and then solidifying the powder material by fusing together the powder material. Apparatus for producing such three-dimensional objects is also disclosed.

10 Claims, 3 Drawing Sheets

METHOD AND DEVICE FOR PRODUCING THREE-DIMENSIONAL OBJECTS

FIELD OF THE INVENTION

The present invention relates to a method and apparatus for producing three-dimensional objects layer by layer using a powdery material which can be solidified by irradiating it with a high-energy beam. In particular, the present invention relates to a powder pre-heating process using an electron beam.

BACKGROUND OF THE INVENTION

Equipment for producing a three-dimensional object layer by layer using a powdery material which can be solidified, or fused together, by irradiating it with a high-energy beam of electromagnetic radiation or electrons are known from e.g. U.S. Pat. Nos. 4,863,538 and 5,647,931 and Swedish Patent No. 524,467. Such equipment includes for instance a supply of powder, means for applying a layer of powder on a vertically adjustable platform or working area, and means for directing the beam over the working area. The powder sinters or melts and solidifies as the beam moves over the working area.

When melting or sintering a powder using a high-energy beam, it is important to avoid exceeding the vaporization temperature of the powder, since otherwise the powder will merely vaporize instead of forming the intended product. U.S. Patent Publication No. 2005/0186538 discloses a method focusing on this problem. In this method a laser beam is repeatedly directed to the same powder target area during the melting/sintering phase so as to stepwise raise the powder temperature. In this manner, too high a powder temperature is avoided.

When using an electron beam instead of a laser beam, the situation is in some ways different. As the electron beam hits the powder, a charge distribution develops around the electron target area. If the charge distribution density exceeds a critical limit, an electrical discharge will occur since the powder particles will repel each other. The result of such a discharge is that the structure of the powder layer will be destroyed. Applying the method according to U.S. Patent Publication No. 2005/0186538 to a powder melting/sintering device equipped with an electron beam is likely to give a poor result since no measures are taken in that method to avoid such discharges.

One solution to the problem of avoiding discharges is to add conductive material, such as carbon, to the powder so as to increase the electrical conductivity of the powder. Disadvantages of this solution are, however, that the solidifying process of such a powder mixture may be difficult to control and that the properties of the formed product may be affected in a negative way. For instance, the mechanical strength may be decreased.

One object of the present invention is to provide a method and apparatus for the layered production of three-dimensional objects from a powdery material, which method and apparatus allow for a controlled and proper fusing together of the powdery material, and which are well suited for both an electron beam and a laser beam.

SUMMARY OF THE INVENTION

These and other objects have now been realized by the discovery of a method for producing three-dimensional objects from a powder material capable of solidification by irradiation with a high energy beam, the method comprising homogeneously pre-heating the powder material by scanning a predetermined pre-heating area including the powder material with the high-energy beam along a plurality of predetermined paths distributed over the predetermined pre-heating area in a manner such that consecutive paths of the plurality of predetermined paths are separated by at least a predetermined minimum security distance adapted to prevent undesirable summation effects in the predetermined pre-heating area and solidifying the powder material by fusing together the powder material. Preferably, the homogeneously pre-heating includes rescanning the predetermined pre-heating area with the high-energy beam. In a preferred embodiment, the plurality of predetermined paths comprises a first plurality of predetermined paths and the rescanning comprises scanning the predetermined pre-heating area along a second plurality of predetermined paths distributed over the predetermined pre-heating area in a manner such that consecutive paths of the second plurality of predetermined paths are separated by at least an interspacing distance which is less than the predetermined minimum security distance.

In accordance with one embodiment of the method of the present invention, the method includes increasing the power of the high-energy beam during the homogeneously pre-heating of the powder material. In a preferred embodiment, the increasing of the power comprises a stepwise increase between consecutive scanning of the plurality of predetermined paths.

In accordance with another embodiment of the method of the present invention, the high-energy beam comprises an electron beam, and the increasing of the power comprises increasing the current of the electron beam.

In accordance with another embodiment of the method of the present invention, each of the plurality of predetermined paths are scanned from one end of the predetermined paths to the other end of the predetermined paths.

In accordance with another embodiment of the method of the present invention, each of the plurality of predetermined paths comprises parallel paths. In another embodiment, each of the plurality of predetermined paths comprises a straight line.

In accordance with another embodiment of the method of the present invention, the powder material covers a predetermined powder area, and the predetermined pre-heating area is greater than the predetermined powder area by a predetermined security margin.

In accordance with the present invention, these and other objects have also been realized by the invention of apparatus for producing three-dimensional objects from a powder material capable of solidification by irradiation with a high-energy beam, the apparatus comprising scanning means for homogeneously pre-heating the powder material by scanning a predetermined pre-heating area including the powder material with the high-energy beam along a plurality of predetermined paths distributed over the predetermined pre-heating area in a manner such that consecutive paths of the plurality of predetermined paths are separated by at least a predetermined minimum security distance adapted to prevent undesirable summation effects in the predetermined heating area and fusing means for solidifying the powder material by fusing together the powder material.

The present invention concerns a method for producing three-dimensional objects layer by layer using a powdery material, which can be solidified by irradiating it with a high-energy beam. The present invention is characterized by a method which comprises a pre-heating step with the general purpose of pre-heating the powdery material in a homogeneous manner, followed by a solidifying step with the general purpose of fusing together the powdery material, wherein the pre-heating step comprises the sub-step of scanning a pre-heating powder layer area by scanning the beam along paths distributed over the pre-heating powder layer area, wherein consecutively scanned paths are separated by, at least, a minimum security distance, the minimum security distance being adapted to prevent undesirable summation effects in the pre-heating powder layer area from the consecutively scanned paths.

An advantage of the present invention is that the pre-heating step allows the powder layer to be homogenously heated so as to avoid having too large a temperature gradient in the interface between melted metal and powder in the subsequent solidifying step. By using a security distance adapted to prevent summation effects from consecutively scanned paths, it is possible to prevent the energy deposited to the powder during scanning of a first path adding to the energy deposited during scan of a second path scanned directly after the first path. Thus, large temperature gradients can also be avoided during the pre-heating stage.

When using an electron beam the pre-heating has a further advantageous effect in that it increases the electrical conductivity of the powder. This, in turn, has the effect that a high beam current can be used in the subsequent solidifying step. Also, the security distance has an additional advantage when using an electron beam in that it eliminates the risk of forming too large a charge density in the relatively cool powder during the pre-heating step. Thus, powder discharge is prevented.

The inventive use of the beam for pre-heating the powder has several advantages compared to the rather obvious alternative to heat up an entire powder bed using e.g. heating elements. One advantage is that no further heating equipment is needed. Another advantage is that only the part of the powder bed that really needs to be heated, i.e. a fraction of the upper layer of the powder bed, is actually heated. This makes the process very efficient.

In a first advantageous embodiment of the method of the present invention the pre-heating step further comprises the sub-step of re-scanning the pre-heating powder layer area. In this manner, the pre-heating area can be gradually and homogeneously heated up. Preferably, the paths followed during a re-scan of the pre-heating powder layer area are displaced an interspacing distance in relation to the paths followed during a previous scan of the pre-heating powder layer area, wherein the interspacing distance is less than the minimum security distance. In this manner, it is possible to obtain a homogeneously pre-heated powder layer area in situations where it is necessary to use a scanning pattern where the paths are physically separated by a distance that is shorter than the minimum security distance, i.e. in situations where additional, more closely positioned paths are needed.

In a second advantageous embodiment of the inventive method of the present invention, the power of the beam is increased during the pre-heating step. This has the advantage that the beam power initially can be kept at a sufficiently low level to avoid large charge densities and/or temperature gradients, but also that the beam power increases so as the temperature of the powder increases as to speed up the pre-heating process as much as possible. In a preferred variant of the method of the present invention, the power of the beam is increased stepwise between consecutive scans or re-scans of the pre-heating powder layer area. This makes it relatively easy to control the process and allows the powder pre-heating area to be heated in a uniform manner.

In a third advantageous embodiment of the method of the present invention, the beam is an electron beam wherein the beam power is increased by increasing the beam current.

Preferably, the paths form substantially straight and parallel lines. Such paths simplifies the labor of finding a path pattern and path scanning order that works in practice, considering summation effects, etc. Using straight and parallel paths also simplifies the control of the beam during scanning. To further simplify the process, the paths are preferably scanned from one end to the other.

In a fourth advantageous embodiment of the method of the present invention, the pre-heating powder layer area is larger than, and thereby forms a security margin with respect to, a corresponding part of the powder layer that is to be fused together in the subsequent solidifying step. Such a security margin ensures that the whole product area, including its close surroundings, is properly pre-heated, i.e. such that the temperature and electrical conductivity of the powder layer do not change abruptly at the outer border of parts that are to be fused together. Without such a security margin it is likely that problems will arise due to a too large temperature gradient and/or a too large charge density.

The present invention also concerns a device adapted to be operated according to the method of the present invention.

BRIEF DESCRIPTION OF DRAWINGS

In the following detailed description of the present invention, reference is made to the following figures, in which.

DETAILED DESCRIPTION

Figure 1:
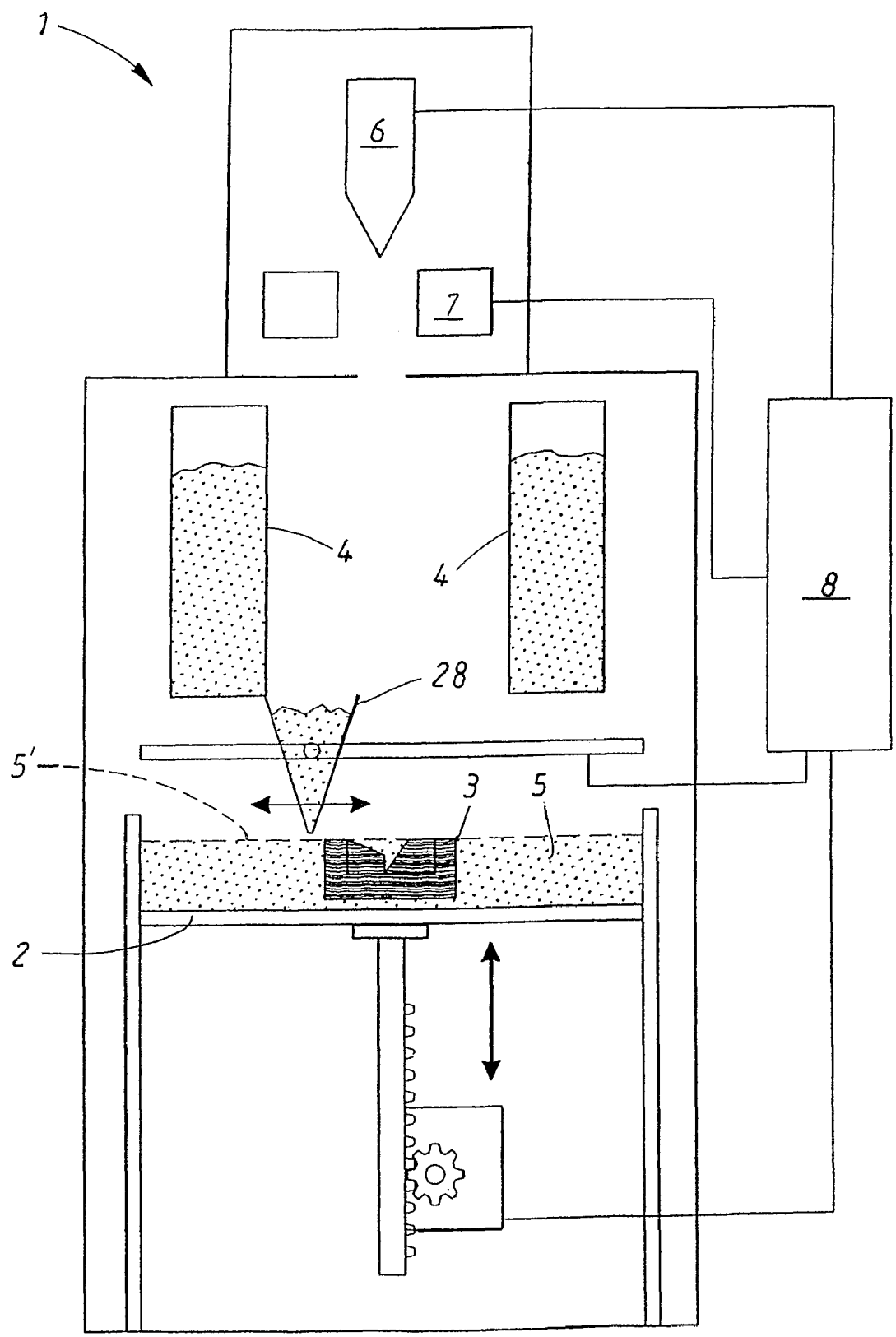
FIG. 1 is a side, elevational, schematic view of an example of a known device for producing a three-dimensional product to which device the method of the present invention can be applied.

FIG. 1 shows an example of a known device 1 for producing a three-dimensional product. The device 1 comprises a vertically adjustable work table 2 on which a three-dimensional product 3 is to be built up, one or more powder dispensers 4, means 28 arranged to distribute a thin layer of powder on the work table 2 for forming a powder bed 5, a radiation gun 6 in the form of an electron gun for delivering energy to the powder bed 5 as to fuse together parts of the powder bed 5, deflection coils 7 for guiding the electron beam emitted by the radiation gun 6 over said work table 2, and a control unit 8 arranged to control the various parts of the device 1. In a typical work cycle, the work table 2 is lowered, a new layer of powder is applied onto the powder bed 5, and the electron beam is scanned over selected parts of the upper layer 5' of the powder bed 5. In principal, this cycle is repeated until the product is finished. An expert in the field is familiar with the general function and composition of devices for producing a three-dimensional product, both with regard to the type outlined in FIG. 1 and to devices equipped with a laser gun instead of an electron gun.

In the case where an electron beam is used, it is necessary to consider the charge distribution that is created in the powder bed as the electrons hit the powder bed 5. The invention is, at least partly, based on the realization that the charge distribution density depends on the following parameters: beam current, electron velocity (which is given by the accelerating voltage), beam scanning velocity, powder material and electrical conductivity of the powder, i.e. mainly the electrical conductivity between the powder grains. The latter is in turn a function of several parameters, such as temperature, degree of sintering and powder grain size/size distribution.

Thus, for a given powder, i.e. a powder of a certain material with a certain grain size distribution, and a given accelerating voltage, it is possible, by varying the beam current (and thus the beam power) and the beam scanning velocity, to affect the charge distribution.

By varying these parameters in a controlled way, the electrical conductivity of the powder can gradually be increased by increasing the temperature of the powder. A powder that has a high temperature obtains a considerably higher conductivity which results in a lower density of the charge distribution since the charges quickly can diffuse over a large region. This effect is enhanced if the powder is allowed to be slightly sintered during the pre-heating process. When the conductivity has become sufficiently high, the powder can be fused together, i.e. melted or fully sintered, with arbitrary values of the beam current and beam scanning velocity.

Figure 2:
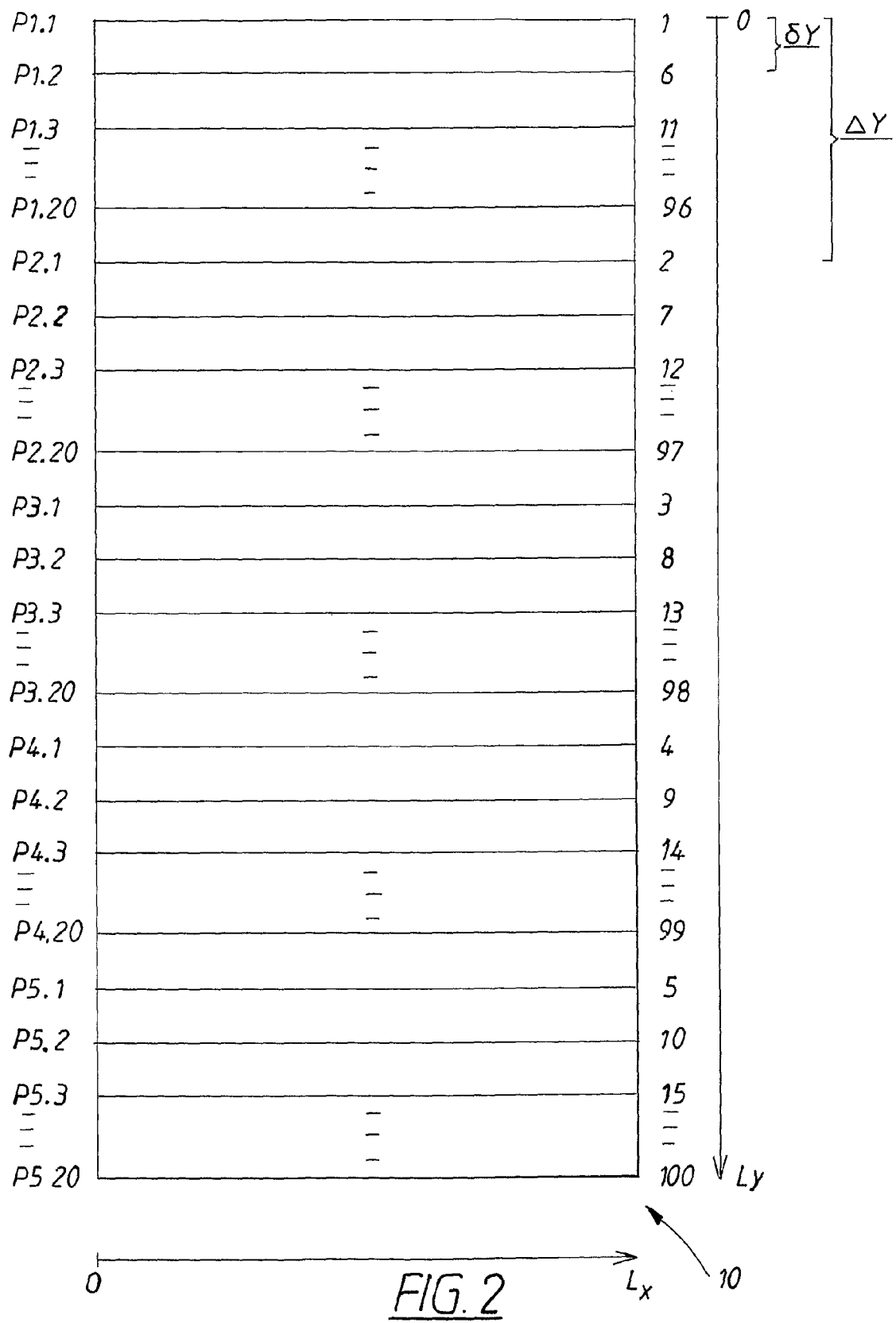
FIG. 2 in a top, elevational view of an example of a first preferred embodiment of the method of the present invention.

A preferred embodiment of the inventive method, wherein the conductivity is increased without creating discharges, is shown in FIG. 2. Here, the beam is scanned along paths distributed in a certain pattern over a part of the powder bed 5 that is to be solidified, for the purpose of pre-heating the powder. The part of the upper layer 5' of the powder bed 5 subjected to pre-heating is denoted the pre-heating powder layer area 10, or only pre-heating area 10 (see also FIG. 3). Reference numbers $L_x$ and $L_y$ denotes the sides of the, in this example rectangular, pre-heating area 10. The beam follows the paths, indicated by straight and parallel lines P1.1, P1.2 etc, from the left to the right, i.e. from $x=0$ to $x=L_x$. On the left side of the lines/paths, a code of each path is given. On the right side of the lines/paths, the order in which the paths are scanned is given. Thus, the first path to be scanned is P1.1, the next path is P2.1, after that path P3.1 and so on. Such consecutively scanned paths are physically separated by a security distance $\Delta Y$ that will be further discussed below.

Depending on the particular conditions, such as dimensions of pre-heating area 10, beam power and beam scanning velocity, it may be necessary to use a scanning pattern where the paths are physically separated by a distance that is shorter than the minimum security distance $\Delta Y$ in order to obtain a homogeneously pre-heated powder layer area 10. FIG. 2 shows an example of such a case where additional, more closely positioned paths are needed. The additional paths are indicated with codes P1.2, P1.3 etc. Adjacent paths, such as P1.20 and P2.1 or P3.2 and P3.3, are physically separated by an interspacing distance $\delta Y$. As can be seen on the right side of the lines/paths in FIG. 2, adjacent paths are not scanned in a consecutive order in order to still separate consecutively scanned paths by the security distance $\Delta Y$.

In the example shown in FIG. 2, the pre-heating area 10 can be seen as divided into five sub-areas, P1 to P5, and in each sub-area the number of paths to be scanned are 20; e.g. P1.1 to P1.20 in the first sub-area P1. More generally, the paths can be denoted PM.N, wherein M is the number of the sub-area and N is the number of a particular path in the sub-area M. In FIG. 2, M goes from 1 to 5 and N goes from 1 to 20, which leads to a total number of 100 paths to be scanned. The values of M and N may be varied depending on e.g. the size of the pre-heating area 10 and on the desired pre-heating temperature and/or desired degree of pre-sintering of the powder.

As given by the path scanning order in FIG. 2, the pre-heating area 10 is scanned several times in the y-direction, in this example 20 times. The first time the pre-heating area 10 is scanned, the scanning procedure is such that the first path PM.1 in each sub-area P1 to P5 is scanned. When this initial step is finished, the pre-heating area 10 is re-scanned by scanning the second path PM.2 in each sub-area P1 to P5. In the next re-scan, the third path PM.3 in each sub-area P1 to P5 is scanned, and so on. This procedure may be seen as one single scanning pattern, comprising the N:th path of each sub-area P1-P5, which single scanning pattern is displaced in the y-direction, i.e. downwards in FIG. 2, a distance corresponding to the interspacing distance $\delta Y$ once the scan of all paths in the single scanning pattern has been completed. In other words, the paths of a re-scan are displaced in parallel a distance $\delta Y$ relative to the paths of the previous scan. The reference N denotes the order of the scan or re-scan of the pre-heating area 10, wherein N starts with 1 (for the first scan) and goes to a maximum value that, in this example, is 20 (for the last scan). Below, this maximum value of N is denoted $N_r$.

Each scanning or re-scanning of the pre-heating area 10 has the effect of increasing the temperature of the powder bed that in turn has the effect of increasing the electrical conductivity of the powder. The beam current can therefore be increased after each (re-)scanning procedure. How much the beam current can be increased between the scans depends on how much the conductivity can be increased in the preceding scan.

It is important that the beam current, the beam scanning velocity and the paths to be scanned are adapted such that the charge density around the position where the beam hits the powder is prevented from exceeding a critical limit above which discharge will occur.

A general function for describing the charge density that develops in the powder in an arbitrary scanning procedure will be a rather complex function of time and beam position since the charge density generated along one scanned path will be affected by the charge density generated along another scanned path if these paths are not very well separated in space and time. Thus, summation effects between different paths must be taken into account.

In a predetermined scanning procedure using straight and parallel scanning paths, similar to those shown in FIGS. 2 and 3, summation effects are much easier to control. For a single, straight path the charge density depends the fraction $I/V_s$, where I is the beam current and $V_s$ is the beam scanning velocity relative to the powder bed. If this fraction is too high, too much charge will be deposited to the powder per path length unit. From a production point of view it is desirable to increase the temperature in an efficient manner to minimize the time required for pre-heating the powder. Thus, the beam current and the beam velocity should be as high as possible without exciding the critical limit in charge density. However, since charges will remain around a scanned path for some time the summation of charge density between different scans has to be considered. It is important that the beam does not return to the same position, or to the close vicinity of the same position, until a certain minimum time period $t_0$ has elapsed.

Thus, for a given path length in a pre-heating area 10 the beam scanning velocity is not solely determined by the fraction $I/V_s$ but also by the time period $t_0$ that has to elapse before the beam can return to the same position. As the charge density decreases not only with time but also with distance from the previously scanned position, the required time period that must be allowed to elapse before a certain position of the powder layer can be scanned decreases with increasing distance from the previously scanned position. In a first order approximation this distance-dependent security time period, $t_p$, can be considered to be independent of beam current and set to:

$$t_p = t_0 - k_r \cdot r,$$

where $t_0$ is the time that has to elapse before the beam can return to the same position as it was at t=0, r is the distance between the beam position at t=0 and the new position at time t, and $k_r$ is a proportional factor. Here, $t_p$ is assumed to have values between 0 and $t_0$, which means that summation effects are considered to be negligible for sufficient large values of r.

Consequently, the scanning of the paths of the pre-heating area 10 must be arranged such that the paths become sufficiently separated in time and/or space so as to avoid undesirable charge summation effects in the pre-heating powder layer area 10. This holds both for charge summation effects as discussed above and for energy summation effects wherein the amounts of energy deposited along two paths add together so as to locally raise the temperature too much. Consecutively scanned paths, such as P4.2 and P5.2 in FIG. 2, must be physically separated to a higher extent than other scanned paths since the time period elapsed between consecutively scanned paths is shorter (provided that the paths are of equal length and an equal time period between start of the scan of each individual path).

From a given beam scanning velocity, $V_s$, and a given length of the paths, $L_x$, it is possible to convert the required distance-dependent security time period $t_p$ to a minimum security distance $\Delta Y$, which is easier to handle in practice than a minimum time period. The required length of this distance $\Delta Y$ depends on how fast the beam returns to x=0. Thus, $\Delta Y$ increases with decreasing length of the paths $L_x$ and with increasing beam scanning velocity $V_s$. In FIG. 2, consecutively scanned path, such as P4.2 and P5.2, are separated by the minimum security distance $\Delta Y$.

As described above, a certain time period must be allowed to elapse before different paths can be scanned. In order to reduce the total time required for pre-heating the powder, it is important that the beam scans parts of the pre-heating area 10 that are not subject to a "period of rest" set by $t_p$.

In the example below the following parameters are used:

$L_x$, $L_y$=lengths of the sides of the pre-heating powder layer area 10, $V_s$=beam scanning velocity, $I_0$=initial beam current, $\Delta I$=beam current increase between re-scanning of the pre-heating area 10, $N_r$=number of times the pre-heating area 10 is scanned, $\Delta Y$=distance between two consecutively scanned paths; minimum security distance, and $\delta Y$=distance between two adjacent path; interspacing distance.

For a given powder layer area, i.e. where values of $L_x$, $L_y$ are given, it is possible to empirically obtain the values for $V_s$, $I_0$, $\Delta I$, $N_r$, $\Delta Y$ and $\delta Y$ that are required for a proper pre-heating of the powder area in question.

Table 1 shows an example of proper values of $V_s$, $I_0$, $\Delta I$, $N_r$, $\Delta Y$ and $\delta Y$ for a certain powder layer area ($L_x$, $L_y$), a certain accelerating voltage (60 kV), and a certain, commercially available, powder (gas atomized ELI Ti6Al4V).

TABLE 1

| | |
|---|---|
| $L_x$ | 120 mm |
| $L_y$ | 120 mm |
| $V_s$ | 10000 mm/s |
| $I_0$ | 1 Ma |
| $\Delta I$ | 1 mA |
| $N_r$ | 18 |
| $\Delta Y$ | 24 mm |
| $\delta Y$ | 1.2 mm |

Assuming that the time required for the beam to "jump" between different paths is negligible (which normally is a fair assumption since the "jump" velocity of a beam normally is much greater than its scanning velocity) and assuming that linear relationships are valid, it is possible to use the parameter values in table 1 for producing relationships that can be used for arbitrary values of $L_x$ and $L_y$. To obtain the most accurate empirical values, these values should be produced using a powder area that is as small as possible, i.e. the values of $L_x$ and $L_y$ should be as small as possible. However, approximate empirical values, that might be sufficiently accurate, can be obtained in a faster way by starting out with a larger powder area (larger $L_x$ and $L_y$). Preferably, the same value of $\delta Y$ is used independently of the values of $L_x$ and $L_y$ because $\delta Y$ also affects the surface finish of the completed three-dimensional product. It is also important that the total energy deposited per area unit is evenly distributed in order to keep the temperature as even as possible over the powder area in question irrespective of the values of $L_x$ and $L_y$.

With reference to table 1, the following relationships and limiting parameters are valid:

$$t_0 = (L_y/\Delta Y) \cdot L_x/V_s,$$

$$k_r = (t_0 - L_x/V_s)/\Delta Y,$$

$$k_1 = I_0/V_s,$$

$$k_2 = \Delta I/V_s, \text{ and}$$

$$k_3 = (I_0 + N_r \cdot \Delta I) \cdot N_r/(V_s \cdot \delta Y \cdot 2),$$

where $t_0$ is the minimum time period that must be allowed to pass before the beam returns to (the close vicinity of) a previously scanned path (i.e. $t_0$ is the time period that has to elapse before the beam can return from e.g. line PM.N to PM.N+1); $k_r$ is the factor used to determine the time period that must be allowed to pass before the beam returns to x=0 at a distance $\Delta Y$ from a previously scanned path; $k_1$ is proportional to the maximum amount of charge deposited per mm of the paths during the first scan of the pre-heating area 10; $k_2$ is proportional to the maximum charge deposition increase per mm for each re-scan of the pre-heating area 10; and $k_3$ is proportional to an average energy deposition per mm² required for keeping the powder surface at a certain temperature.

Here, $t_0$ and $k_r$ are minimum values, whereas $k_1$ and $k_2$ are maximum values that should not be exceeded. The factor $k_3$ is a form of guideline value but can be seen as a maximum value that should not be exceeded for the purpose of speeding up the process.

Values of these limiting parameters can be obtained by using the empirically obtained values in table 1. After having obtained these limiting parameters, they can be used to calculate the five unknown parameters $V_s$, $I_0$, $\Delta I$, $N_r$, and $\Delta Y$ for arbitrary values of $L_x$ and $L_y$, as long as $\delta Y$ is kept at almost the same value. Some care has to be taken since the fractions $L_y/\Delta Y$ and $\Delta Y/\delta Y$ have to be integers. Thus, the parameters may be determined in an iterative way where, for instance, $L_x$ is kept fixed whereas $L_y$ and $\delta Y$ are allowed to vary somewhat.

The task of obtaining empirical values, such as those given in table 1, for other types of powders on the basis of the information given in this text, can be considered to be routine work for a man skilled in the art. A general rule is that $t_0$, and thus $t_p$, increase with decreasing conductivity of the powder. Thus, for a powder with a low conductivity, large values for $L_x, L_y, V_s, N_a$ and $\Delta Y$ might be necessary; in conjunction with low values for $I_o$ and $\Delta I$.

As described above, pre-heating of the powder layer may be performed over a rectangular powder layer area that encloses all parts of the powder that are to be fused together. This may, however, be an inefficient approach since, depending on the form of the product to be produced; an unnecessarily large powder area might be heated up.

Figure 3A:
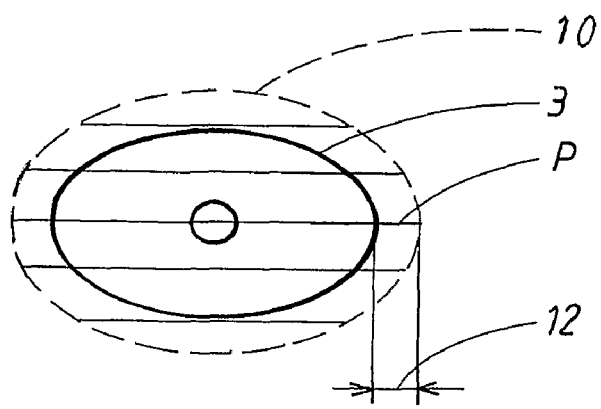
FIG. 3a is a top, elevational view of one example of how to apply the method of the present invention to one product shape.
Figure 3B:
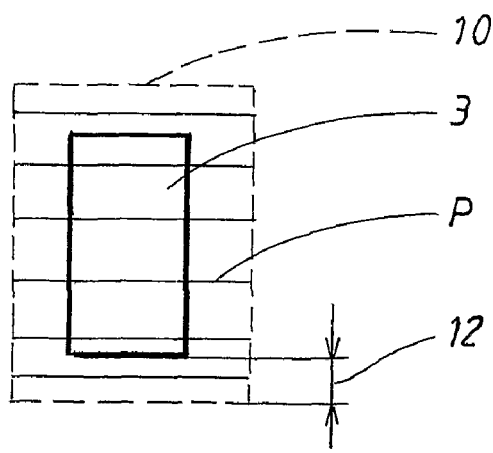
FIG. 3b is a top, elevational view of another example of how to apply the method of the present invention to another product shape.
Figure 3C:
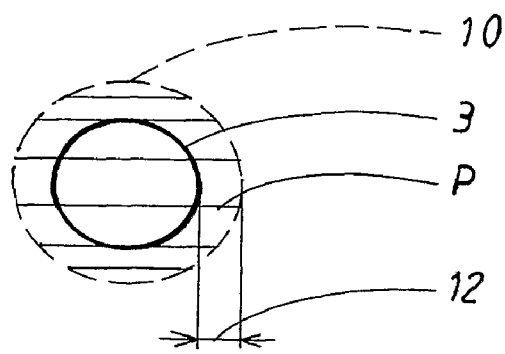
FIG. 3c is a top, elevational view of another example of how to apply the method of the present invention to another product shape.

FIG. 3 schematically shows, in a vertical view, three examples of different shapes of powder layers that are to be fused together as to form a part of the product 3. FIG. 3 also shows the corresponding pre-heating areas 10 (dashed lines) and some selected paths P (thin solid lines) to be followed during the pre-heating scan. FIG. 3a shows a product 3 that, at least in this particular layer, has an oval shape with a hole in the middle, whereas FIGS. 3b and 3c show products 3 having a rectangular and a circular shape, respectively.

As can be seen in FIG. 3, the shapes of the pre-heating areas 10 have the same principal shape as the product, i.e. as the shape of the powder layer to be fused, but the pre-heating areas 10 are enlarged as to enclose the parts that are to be melted together. The size of each pre-heating area 10 is adapted such that a certain security margin 12 is formed with respect to the corresponding part 3 of the powder layer that is to be fused together. The security margin 12 should be sufficient for ensuring that the whole product area 3, including its close surroundings, is properly pre-heated, i.e. such that the temperature and electrical conductivity of the powder layer do not change abruptly at the outer border of the parts that are to be fused together. For the Ti6Al4V-powder mentioned in connection with table 1, the security margin 12 should be at least 6 mm. Generally, the magnitude of the security margin 12 should be increased with decreasing heat and/or electrical conductivity of the powder.

As can be seen in FIGS. 3a and 3c, the lengths of the paths may vary. In such cases it may be needed to adjust some parameters, such as the minimum security distance $\Delta Y$, to take into account that some paths takes shorter time to scan.

If the powder used has a very low electrical conductivity, and/or if the distance is unusually long between the parts of the powder layer that are to be fused together, it may be necessary to pre-heat also parts of the powder layer that are not to be fused together in order to allow the beam to "jump" between the parts that are to be fused together. Otherwise, when repeatedly jumping over the same not-to-be-fused area, the charge distribution density in this area may exceed the critical value.

The term "jump" refers to the situation when the beam quickly is moved from one position to another, for instance from an end position of a path to a starting position of the next path to be scanned. In some applications it may be favourable to "jump" instead of switching the beam on and off.

Once the pre-heating method step has been concluded, a solidifying method step may follow in which the beam energy can be further increased as to melt or sinter the powder grains together. By executing the pre-heating method step in a controlled and accurate manner, it is possible to ensure that the subsequent solidifying step will be properly carried out.

Although most of the advantages of the inventive method can be achieved when using an electron beam, the method is beneficial also in laser beam applications. One example is that the inventive method is capable of producing a homogeneously sintered powder layer area. Such sintered areas will increase the heat conductivity in the powder and thus minimize the possibility of having too large temperature gradients in the interface between melted metal and powder in the subsequent melting step.

The invention is not limited by the embodiments described above but can be modified in various ways within the scope of the claims. For instance, if the ratio $L_x/V_s$ is large, it is possible to position the subsequent path close to the path just scanned. In such a case the security distance $\Delta Y$ may be set equal to the interspacing distance $\delta Y$, i.e. the same paths are scanned in each re-scan.

It is further possible to scan the paths in a different order than what is described in relation to FIG. 2. For instance, the first path in each sub-group (P1.1, P2.1, etc.) could be scanned several times before the second path in each sub-group (P1.2, P2.2, etc.) is scanned. On some occasions, in particular if the fraction $L_x/V_s$ is large, it may also be possible to scan the same path several times without scanning any other paths in between.

Moreover, the paths do not necessarily have to be straight and parallel lines. However, such a path pattern simplifies the labour of finding a path pattern and path scanning order that works in practice, considering summation effects etc. Using straight and parallel paths also simplifies the control of the beam during scanning.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for producing three-dimensional objects from a powder material capable of solidification by irradiation with a high-energy electron beam, said method comprising initially homogeneously pre-heating said powder material by scanning a predetermined pre-heating area including said powder material with said high-energy electron beam along a plurality of predetermined paths distributed over said predetermined pre-heating area in a manner such that consecutive paths of said plurality of predetermined paths are separated by at least a predetermined minimum security distance adapted to prevent undesirable charge summation effects in said predetermined pre-heating area, said minimum security distance being a function of the scanning velocity of said high energy electron beam and the length of said plurality of predetermined paths, whereby said minimum security distance is adapted to allow for a minimum time period between scanning of consecutive ones of said plurality of predetermined paths, followed by the step of solidifying said powder material by fusing together said powder material.

2. The method of claim 1 wherein said homogeneously pre-heating includes rescanning said predetermined pre-heating area with said high-energy electron beam.

3. The method of claim 2 wherein said plurality of predetermined paths comprises a first plurality of predetermined paths and said rescanning comprises scanning said predetermined pre-heating area along a second plurality of predetermined paths distributed over said predetermined pre-heating area in a manner such that consecutive paths of said second plurality of predetermined paths are separated by at least an interspacing distance which is less than said predetermined minimum security distance.

4. The method of claim 1 including increasing the power of said high-energy electron beam during said homogeneously pre-heating of said powder material.

5. The method of claim 4 wherein said increasing of said power comprises a stepwise increase between consecutive scanning of said plurality of predetermined paths.

6. The method of claim 4 wherein said increasing of said power comprises increasing the current of said high energy electron beam.

7. The method of claim 1 wherein each of said plurality of predetermined paths are scanned from one end of said predetermined paths to the other end of said predetermined paths.

8. The method of claim 1 wherein each of said plurality of predetermined paths comprises parallel paths.

9. The method of claim 1 wherein each of said plurality of predetermined paths comprises a straight line.

10. The method of claim 1 wherein said powder material covers a predetermined powder area, and wherein said pre-determined pre-heating area is greater than said predetermined powder area by a predetermined security margin.

* * * * *